United States Patent
Chapman et al.

(10) Patent No.: US 9,849,635 B2
(45) Date of Patent: Dec. 26, 2017

(54) COMPACTION METHOD AND DEVICE FOR AUTOMATED FIBER PLACEMENT

(71) Applicant: The Boeing Company, Chicago, IL (US)

(72) Inventors: Michael Robert Chapman, Federal Way, WA (US); Robert M. Watson, Lynnwood, WA (US); Stephen Howard Williams, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 252 days.

(21) Appl. No.: 14/713,575

(22) Filed: May 15, 2015

(65) Prior Publication Data

US 2016/0332394 A1    Nov. 17, 2016

(51) Int. Cl.
*B29C 70/38* (2006.01)

(52) U.S. Cl.
CPC ................... *B29C 70/384* (2013.01)

(58) Field of Classification Search
CPC ..... B29C 70/386; B29C 70/382; B29C 70/38; B29C 70/30; B29C 70/388
See application file for complete search history.

(56) References Cited

U.S. PATENT DOCUMENTS

| 6,390,169 | B1 * | 5/2002 | Johnson | ............... | B29C 70/384 |
| | | | | | 156/523 |
| 8,052,819 | B2 | 11/2011 | Munaux et al. | | |
| 8,741,084 | B2 | 6/2014 | Kisch et al. | | |
| 8,808,490 | B2 | 8/2014 | Hagman et al. | | |
| 2005/0023728 | A1 | 2/2005 | Benson et al. | | |
| 2009/0139654 | A1 * | 6/2009 | Wampler | ............... | B29C 70/384 |
| | | | | | 156/324 |
| 2014/0083620 | A1 | 3/2014 | Caffiau et al. | | |
| 2014/0283981 | A1 | 9/2014 | Kisch et al. | | |

FOREIGN PATENT DOCUMENTS

| CN | 102700151 A | 10/2012 | | |
| DK | WO 2010055063 A1 * | 5/2010 | ............. | B29C 70/38 |
| WO | WO2010055063 A1 | 5/2010 | | |

OTHER PUBLICATIONS

Desjardien et al., "Automated Ply Forming and Compaction Using Flexible Roller Contact," U.S. Appl. No. 14/446,082, filed Jul. 29, 2014, 44 pages.
Anderson et al., "Placement of Prepreg Tows in High Angle Transition Region," U.S. Appl. No. 14/220,725, filed Mar. 20, 2014, 36 pages.
United Kingdom Intellectual Property Office Search report, dated Sep. 27, 2016, regarding Application No. GB1606985.8, 17 pages.

* cited by examiner

*Primary Examiner* — Vishal I Patel
(74) *Attorney, Agent, or Firm* — Yee & Associates, P.C.

(57) ABSTRACT

A compaction device for use with an automated fiber placement machine includes multiple compaction rollers mounted for independent displacement on a supporting frame. The attitude of the compaction rollers change relative to each other when fiber tows are laid up at an angle over an edge of a tool in order to maintain compaction pressure on the tows and thereby reduce non-compacted areas of the tows.

20 Claims, 10 Drawing Sheets

COMPACTION METHOD AND DEVICE FOR AUTOMATED FIBER PLACEMENT

BACKGROUND INFORMATION

1. Field

The present disclosure generally relates to methods and equipment for laying up composite parts using automated fiber placement, and deals more particularly with a method and device for compacting fiber tows, particularly fiber tows having angular fiber orientations.

2. Background

Automated fiber placement (AFP) machines are used in various industries to layup composite parts, particularly small parts and/or those having complex geometries, to increase rate and precision. AFP machines place a bandwidth of fiber tows on a layup tool such as a mold tool or layup mandrel. The fiber tows may be in the form of split tape, and may comprise thermoset or thermoplastic pre-impregnated unidirectional fiber reinforcements that are laid up in various fiber orientations e.g., 0°, +/−45°, +/−60°, 90°. A bandwidth of the tows are dispensed, cut to length and compacted onto the tool by an AFP head that is typically automatically controlled by a numerically controlled robot or similar manipulator. The incoming fiber tows are often heated to increase their tack before being fed beneath a single compaction roller that both applies and consolidates and/or debulks the entire bandwidth of tows onto the layup tool as the AFP head moves over the tool surface.

Difficulties may be encountered when laying up fiber tows along a path forming an angle relative to an edge on the tool. For example, when laying up fiber tows with +45 or −45° orientations over two tool surfaces intersecting to form a right angle edge, such as a horizontal surface and the vertical surface, there is a resultant area of non-compaction as the roller transitions over the right angle edge and must lift off of the horizontal surface in order to rotate the full bandwidth of tows onto the vertical surface. In the past, this problem has been addressed by making additional passes with the AFP machine over the non-compacted areas, however this approach increases the layup time and associated costs. Another problem associated with using a single compaction roller is the need for laying up additional tow material on the vertical surface in those part applications where an edge of the part falls below a minimum layup distance beyond the area of non-compaction.

Accordingly, there is a need for a method and compaction device for use with AFP machines that reduces the non-compaction area caused by the compaction roller lifting off of the tool surface as it transitions over high angle features. There is also a need for a method and compaction device of the type mentioned above which reduces the need for laying up additional tow material where the edge of the part falls under a minimum layup distance beyond an area of non-compaction.

SUMMARY

The disclosed embodiments provide a method and device for compacting fiber tows on a substrate such as a tool, using automated fiber placement. The device comprises a plurality of compaction rollers mounted for independent movement on a frame forming part of an automated fiber placement head. The use of multiple compaction rollers of smaller diameter, compared to a single larger compaction roller, maintains compaction pressure on the fiber tows at the radius of edge transitions on a layup tool, and in some embodiments may reduce the non-compacted areas of the layup tool to only half of the width of a single one of the tows. The compaction rollers are spring biased to force and compact the fiber tows onto the tool, but may change in attitude (spatial orientation) relative to each other when traversing over an edge between two non-planar tool surfaces in order to maintain contact with the tool and thereby reduce non-compacted areas on the layup. The use of multiple rollers combined with staggered cut/add of the tows at the end of the courses result in a crenulated, near net trim that reduces material waste. The embodiments may reduce layup time and improve part quality by reducing voids caused by non-compaction of fiber tows, and material costs may also be reduced through reduction of scrap.

According to one disclosed embodiment, a device is provided for compacting a bandwidth of fiber tows on a tool. The device comprises a frame adapted to be moved over surfaces of the tool, and a plurality of compaction rollers mounted on the frame for independent relative displacement. Each of the compaction rollers adapted to compact the tows onto the surfaces of the tool. The frame may include a pair of spaced apart arms, and the compaction rollers extend between and have opposite ends thereof respectively rotatably mounted on the pair of arms. Each of the compaction rollers has first and second opposite ends. Pins fixed to each of the first and second ends of the compaction rollers slidely mount the compaction roller on the frame. The device may also comprise springs on the pins for biasing the compaction rollers toward the surfaces of the tool. The compaction rollers extend substantially parallel to each other. The tows each have a width, and there is a pitch between centers of the compaction rollers. The pitch is substantially equal to the width of the tows. The compaction rollers normally lie in a single plane, and at least certain of the compaction rollers are adapted to move out of the single plane when the compaction rollers traverse over an edge between surfaces of the tool. The device may further comprise a bearing block at each end of each of the compaction rollers, wherein each end of the compaction rollers is journaled for rotation in one of the bearing blocks. The pins are respectively fixed to the bearing blocks and are slidable on the frame. The springs are respectively sleeved over the pins for biasing the bearing blocks toward the tool surfaces. The compaction rollers are equal in number to the fiber tows.

According to another disclosed embodiment, a device is provided for compacting a bandwidth of fiber tows on a tool having tool surfaces intersecting at an angle forming an edge on the tool. The device comprises a pair of arms spaced apart from each other, and a plurality of displaceable compaction rollers extending between the arms and mounted on the arms for independent displacement relative to each other as the compaction rollers traverses over the edge on the tool. Each of the compaction rollers is spring biased toward the tool surfaces. The compaction rollers extend substantially parallel to each other and normally lie in a single plane, but are individually displaceable out of the single plane when traversing over the edge on the tool. The compaction rollers are substantially equal in number to the fiber tows in the bandwidth. The distance between centers of adjacent ones of the compaction rollers is substantially equal to a width of each of the tows. The device may further comprise a supporting frame, and suspension mechanisms mounting the compaction rollers on the frame for individual displacement relative to the frame. The compaction rollers extend substantially parallel to each other.

According to still a further embodiment, a method is provided of compacting fiber tows on a tool having at least first and second tool surfaces respectively lying in first and second differing planes intersecting at an angle forming an edge. The method comprises moving an automated fiber placement head over the tool surfaces, and placing fiber tows on the tool surfaces with the automated fiber placement head as the fiber placement head moves over the tool surfaces. The method further comprises compacting the fiber tows against the tool surfaces with a plurality of compaction rollers carried on the fiber placement head, including independently adjusting the spatial orientation of the compaction rollers as the fiber placement head traverses from the first tool surface over the edge to the second tool surface. Compacting the fiber tows includes maintaining contact between each of the compaction rollers and least one of the fiber tows as the fiber placement head traverses from the first surface over the edge to the second surface. The method may further comprise spring biasing each of the compaction rollers toward the tool surfaces. Moving the automated fiber placement head includes moving the automated fiber placement head over the tool surfaces in a direction forming an angle with the edge.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
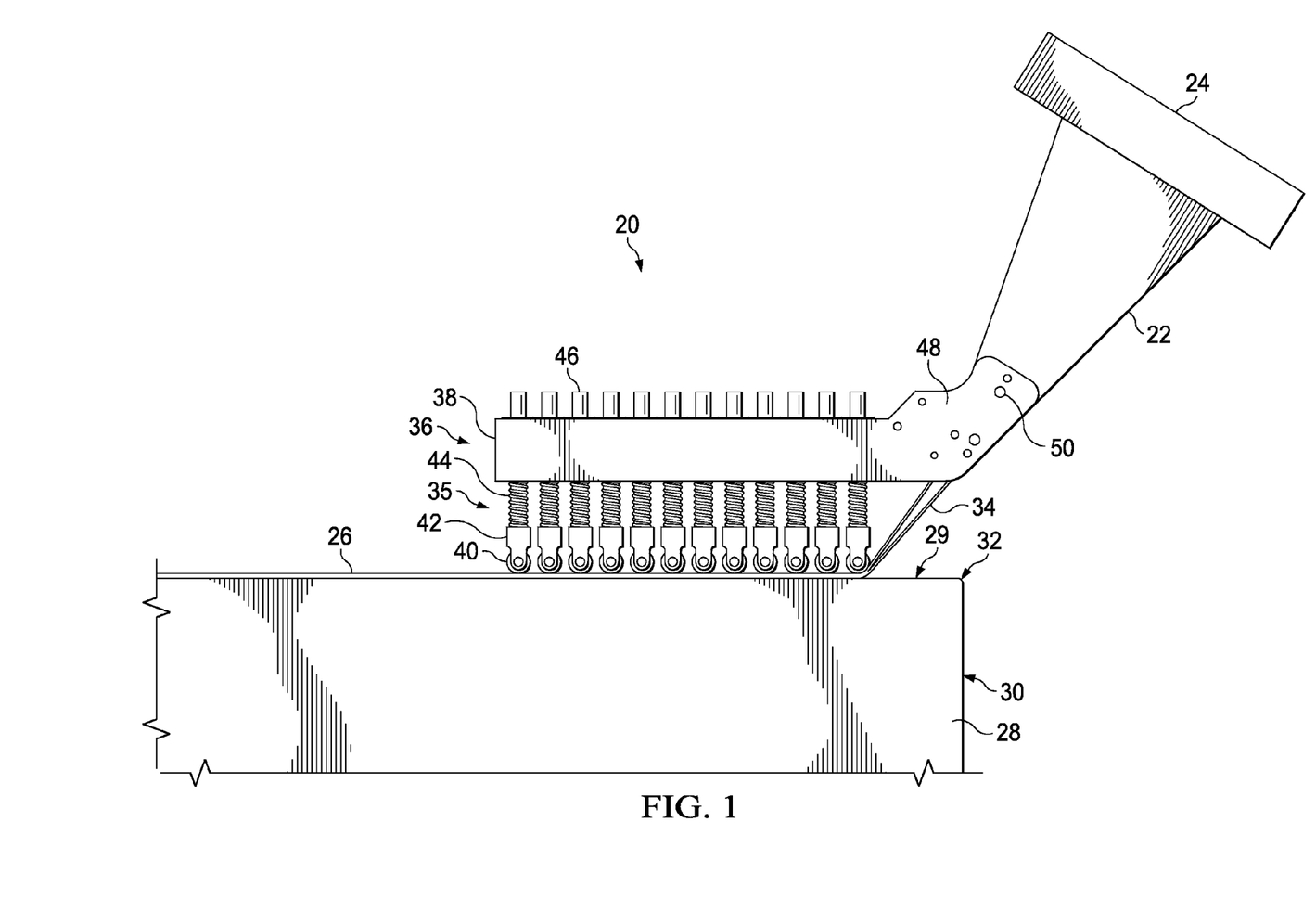
FIG. 1 is an illustration of a side elevational view of a compaction device on an AFP head laying fiber tows on a tool.

Referring first to FIG. 1, an AFP head 22 is mounted on an adapter 24 coupled with a robot (not shown) or similar digital numerically controlled manipulator for laying up composite parts on a tool 28. The AFP head 22 includes a compaction device 20 that is adapted to compact pre-impregnated fiber tows 34 which are fed from and cut to length by the AFP head 22. The fiber tows 34 are laid up in side-by-side relationship, forming a conformal bandwidth 26 of the fiber tows 34. In one embodiment, the fiber tows 34 may comprise slit prepreg tape, however principles of the disclosed embodiments are also applicable to automated tape layup (ATL) in which full width tape is laid down and compacted by the compaction device 20.

The embodiments are well-suited to laying up composite parts on a tool 28 having undulating surfaces or surfaces lying in different planes joined along an edge where traversing the edge with a single compaction roller may result in a portion of the roller lifting away from the tool surface as it translates over the edge. In the illustrated example, the tool 28 includes a first, horizontal surface 29 and a second, vertical surface 30 that intersect along a radius edge 32. As will be discussed below in more detail, the compaction device 20 maintains points of contact with the fiber tows 34 as the AFP head 22 moves from the horizontal surface 29, over the radius edge 32 to the vertical surface 30, thereby reducing or substantially eliminating non-compacted areas of the bandwidth 26.

Referring now to FIGS. 1-4, the compaction device 20 comprises a supporting frame 36 which, in the illustrated example, includes a pair of substantially parallel arms 38. Each of the arms 38 includes a dogleg that is secured to the AFP head 22 by suitable fasteners 50 (FIG. 1). The arms 38 are merely exemplary of a wide range of possible configurations of the supporting frame 36. The compaction device 20 further comprises a plurality of cylindrical compaction rollers 40 that extend substantially parallel to each other and normally lie in a single plane 45 (FIG. 2) when the compaction device 20 is moving over a substantially flat tool surface, such as the horizontal tool surface 29 shown in FIG. 1. Opposite ends of each of the compaction rollers 40 are mounted for displacement on the arms 38 by suspension mechanisms 35 which allow the compaction rollers 40 to change their spatial orientations independently from each other.

The compaction rollers 40 may be formed of a compliant material allowing the compaction rollers 40 to comply with minor surface irregularities while applying the desired compaction force to the fiber tows 34. In one embodiment, the pitch "P" between the central axes of adjacent ones of the compaction rollers 40 is substantially equal to the width "W" of each of the fiber tows 34, and the number of the compaction rollers 40 is equal to the number of tows 34 and the bandwidth 26. The compaction rollers 40 are arranged orthogonal to the arms and each has an end journaled for rotation in a bearing block 42, allowing the compaction roller 40 to rotate and roll over the tool 28 as it compacts the bandwidth 26 against the tool surfaces 29, 30. Each of the bearing blocks 42 is connected to one end of a cylindrical pin 46 which is slidably received in a corresponding one of the arms 38.

Figure 2:
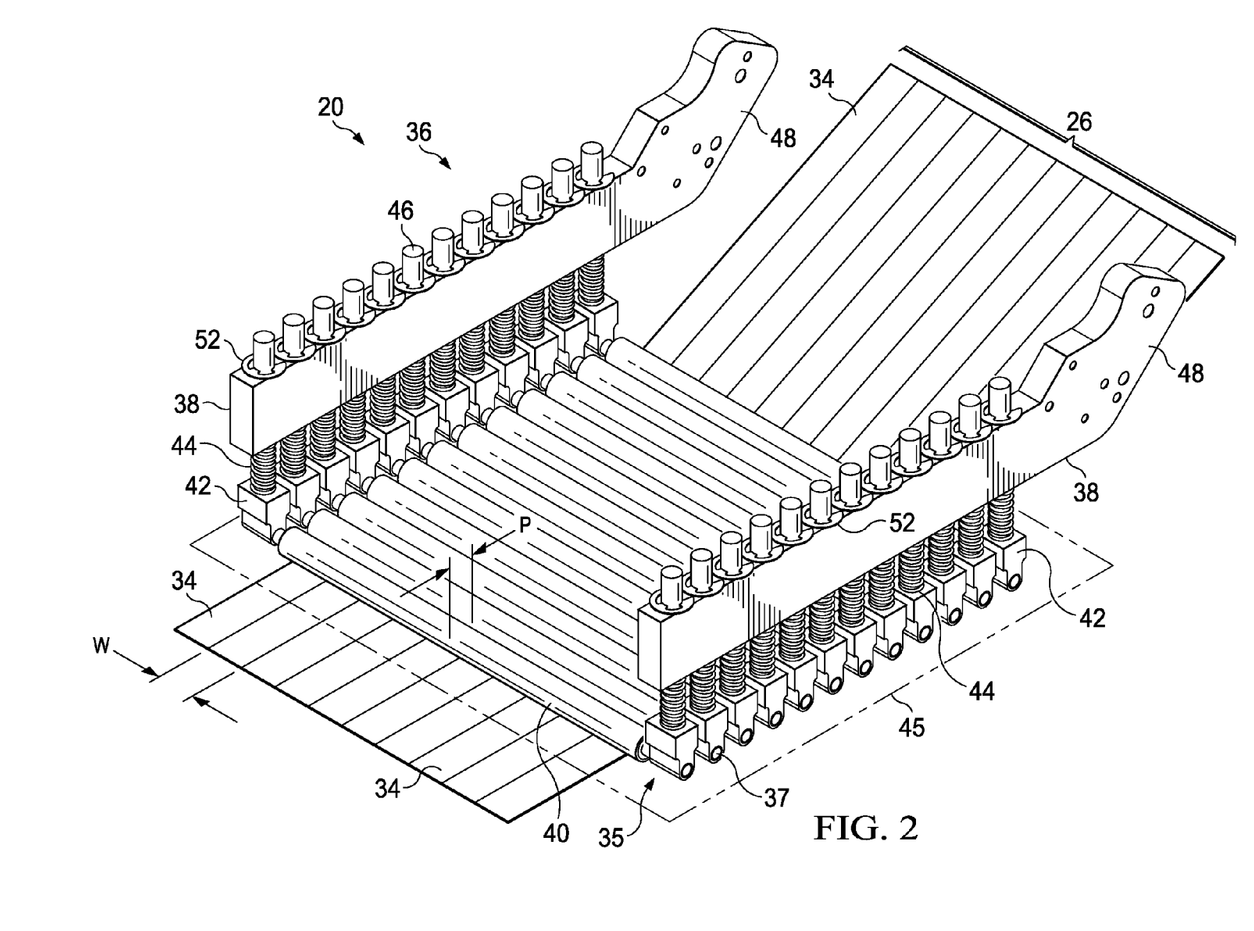
FIG. 2 is an illustration of an upper perspective view of the compaction device compacting a bandwidth of fiber tows.
Figure 3:
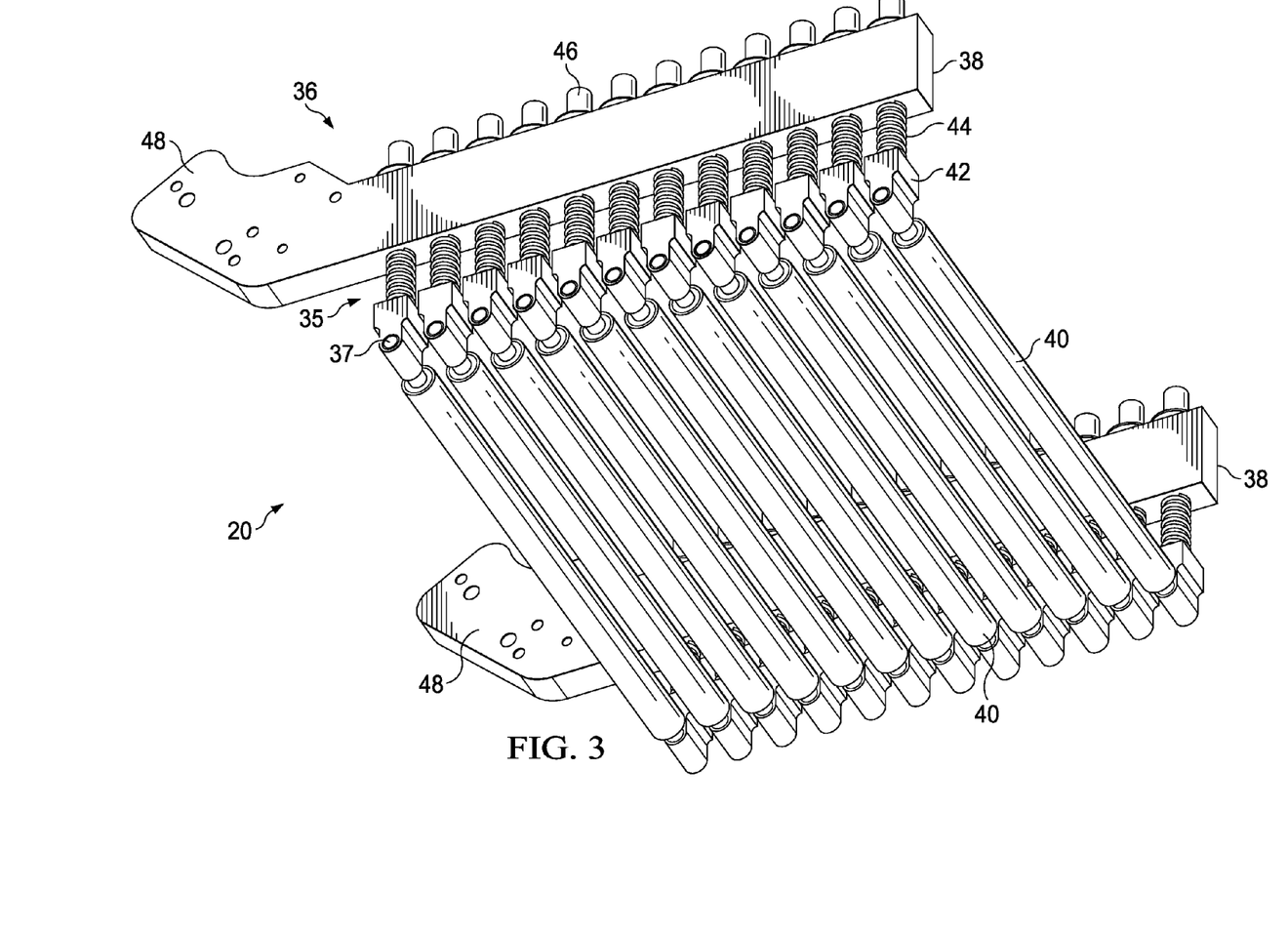
FIG. 3 is an illustration of a lower perspective view of the compaction device.
Figure 4:
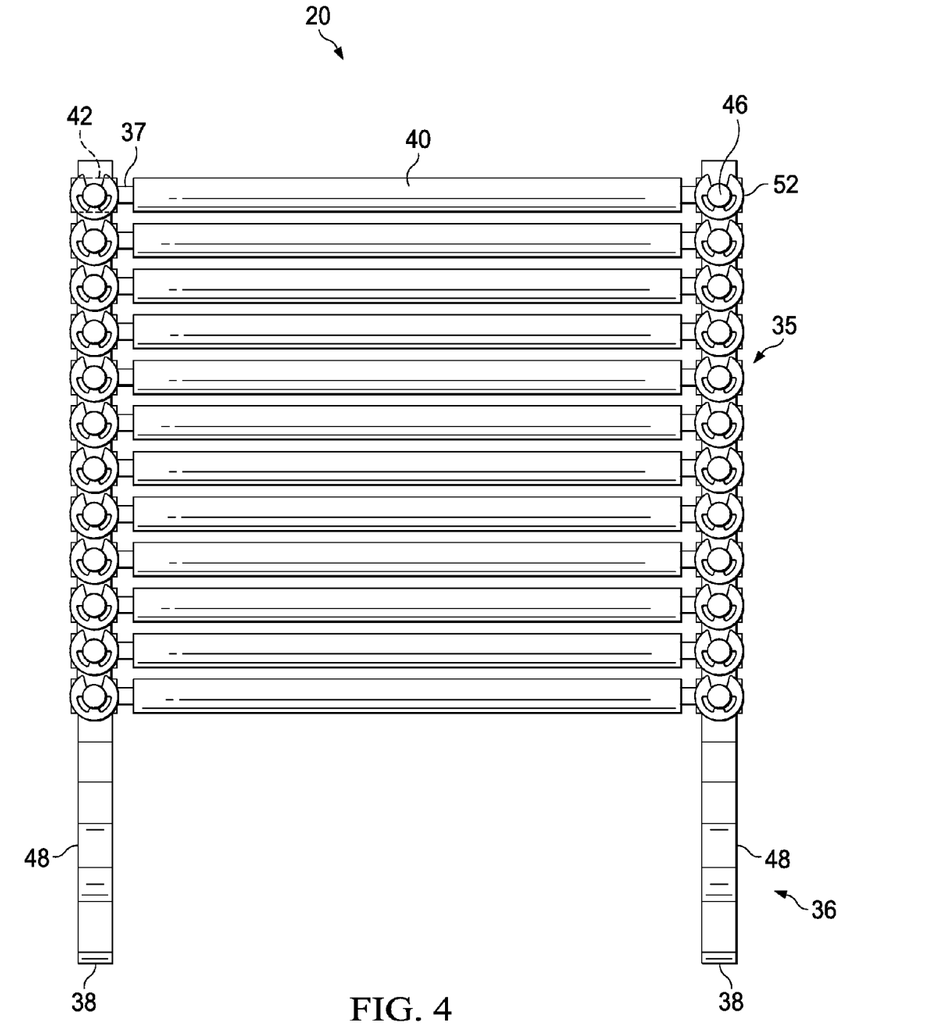
FIG. 4 is an illustration of a top perspective view of the compaction device.

The suspension mechanisms 35 include springs 44 that are respectively sleeved over the pins 46 and are captured between the bearing blocks 42 and the arms 38. The force applied by the springs 44 cause the bearing blocks 42, and thus the compaction rollers 40, to be biased downwardly against the tool 28. The slidable mounting of the pins 46 allow each end of the compaction rollers 40 to be independently displaced upwardly (as shown in FIG. 2) such that the spatial orientation of the compaction rollers 40 (i.e. the angular orientation of the compaction rollers) may self-adjust based on the underlying contour and/or smoothness of the tool 28, as will be described below in more detail.

Figure 5:
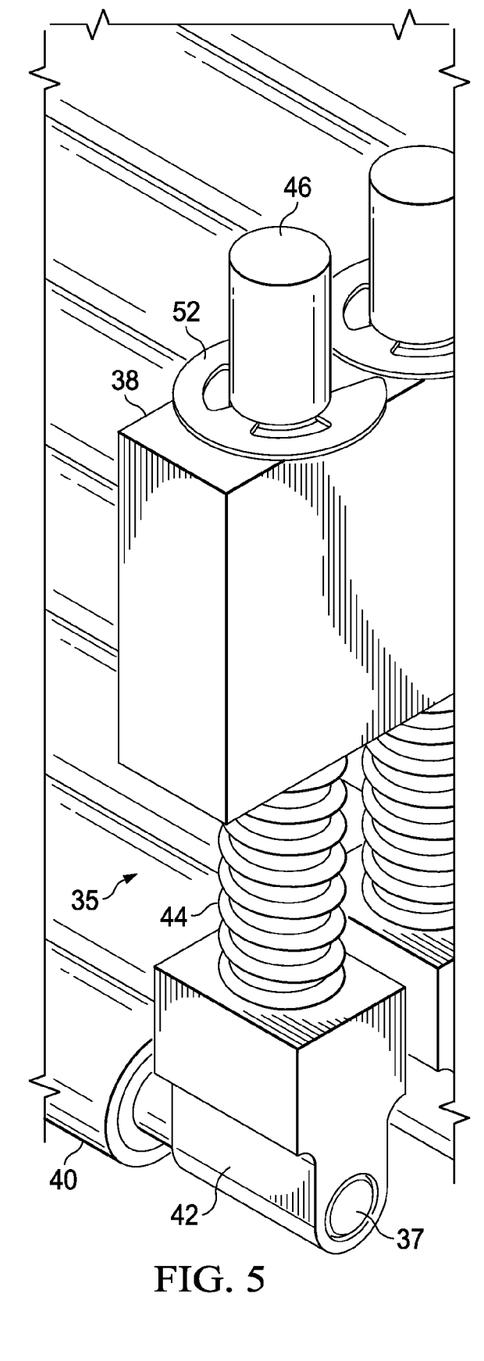
FIG. 5 is an illustration of a perspective view of a suspension mechanism for mounting the compaction rollers on the supporting frame.
Figure 6:
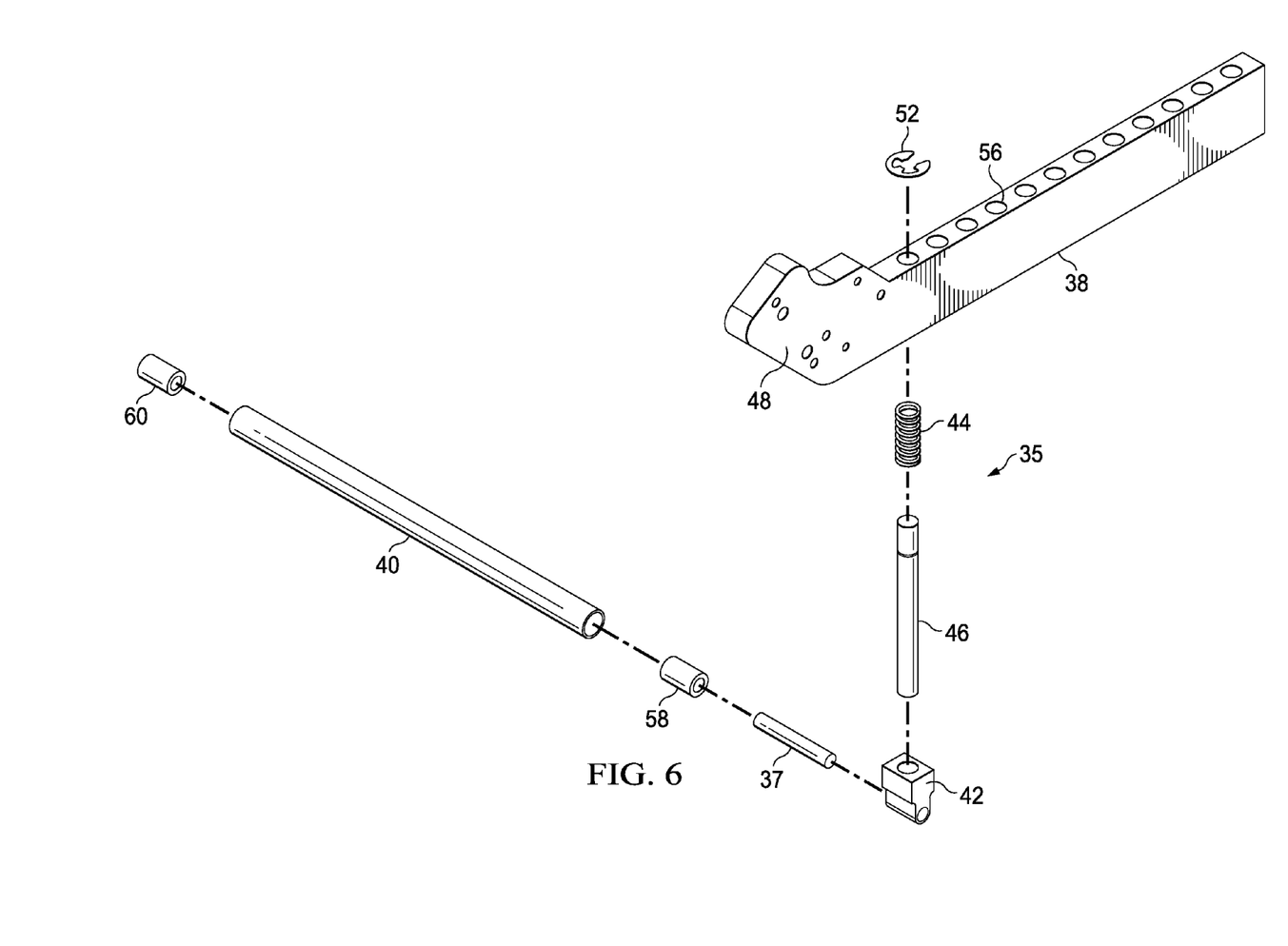
FIG. 6 is an illustration of an exploded, perspective view of the suspension mechanism shown in FIG. 5.
Figure 7:
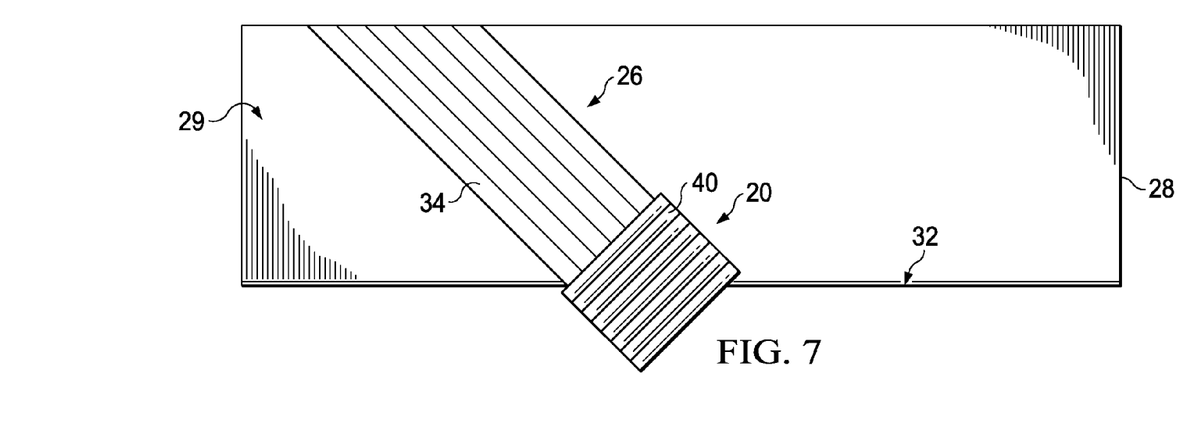
FIG. 7 is an illustration of a diagrammatic plan view of a tool useful in explaining how the compaction device traverses from a first tool plane at an angle over an edge to a second tool plane when laying up a course of fiber tows having a 45° fiber orientation.
Figure 8:
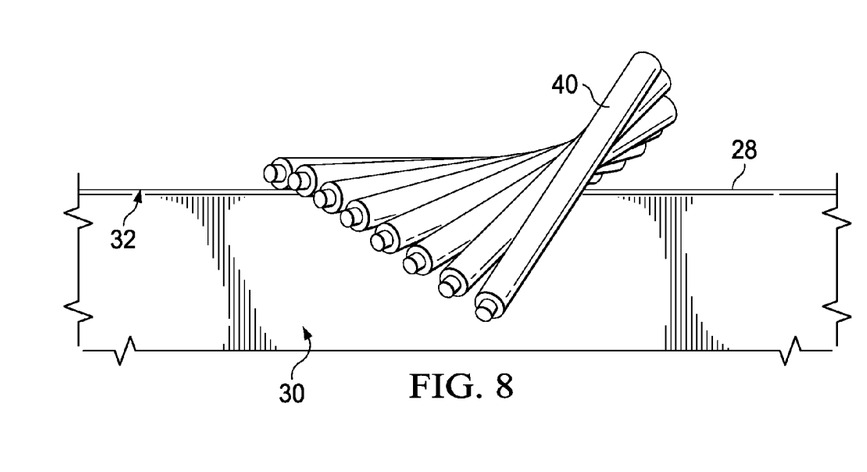
FIG. 8 is an illustration of a front elevational view of the tool, showing the relative displacement and changes in spatial orientation of the compaction rollers as the compaction device traverses over the edge on the tool.
Figure 9:
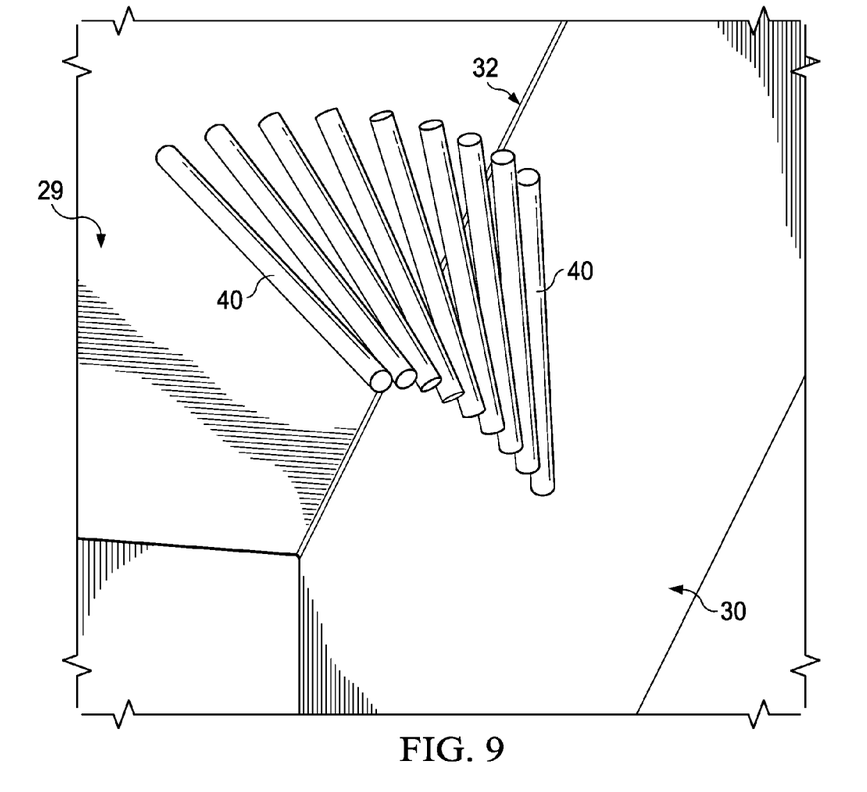
FIG. 9 is an illustration of a perspective view of the tool, showing the compaction device traversing over the edge of the tool, and better illustrating how the compaction rollers remain in contact with the tool surfaces during the transition from the first tool plane to the second tool plane.
Figure 10:
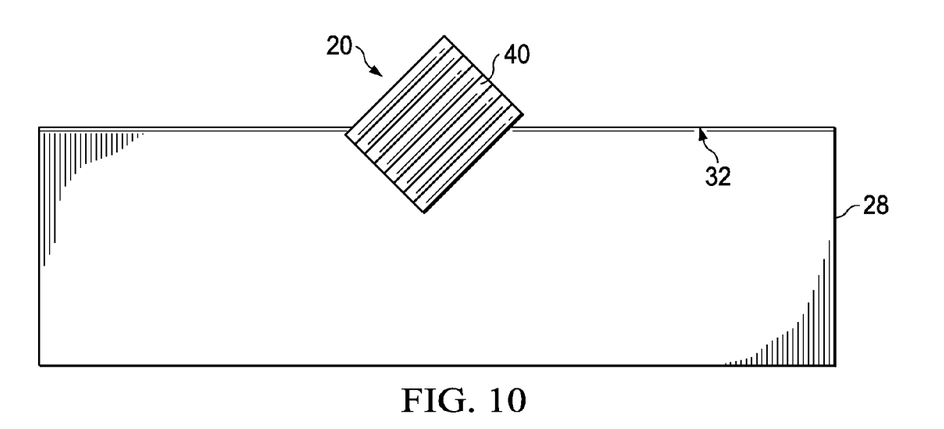
FIG. 10 is an illustration similar to FIG. 7 but showing an elevational view of the tool in which the compaction device has traversed from the first plane over the edge onto the second plane.

Attention is now directed to FIGS. 5 and 6 which illustrate additional details of one of the suspension mechanisms 35 which mount the compaction rollers 40 on the arms 38 in a manner that allow the compaction rollers 42 to adjust in spatial orientation while traversing certain features on the tool 28, such as the radius edge 32. As best seen in FIG. 6, each of the arms 38 includes a plurality of cylindrical through-hole within which the cylindrical pins 46 are slidably received. The upper end of each of the pins 46 is held on the arm 38 by a snap ring 52. The compaction rollers 40 are rotatably mounted on the bearing blocks 42 by axles 37 and bushings 58, 60 received within the ends of the compaction rollers 40. From the foregoing description, it may be appreciated that the compaction rollers 40 may move up and down relative to the arms 38 independently of each other. Moreover, the ends of each compaction roller 40 may also move up and down independently of each other, while the biasing force applied by the springs 44 maintains the desired level of compaction on the compaction roller 40.

Attention is now directed to FIGS. 7-10 which diagrammatically illustrate the compaction device 20 laying down 45° fiber tows on the tool 28 shown in Figure (the AFP head 22 not shown). As the compaction device translates from the horizontal surface 29 onto the vertical surface 30 and passes over the radius edge 32, the individual compaction rollers 40 pivot independently of each other such that the attitude (spatial orientation) of each compaction rollers 40 is adjusted to thereby maintain compaction force against a corresponding one of the fiber tows 34. In other words, as the AFP head rotates over the radius edge 32, the compaction rollers 40 maintain constant point contact with the fiber tows 34 across the entire the bandwidth 26. As a result of this independent adjustment of the compaction rollers 40, each of the tows 34 rolls over the radius edge 32 onto the vertical surface 30 while a continuous compaction force is being applied to each of the tow 34 by at least one of the compaction rollers 40. The springs 44 may assist in assuring that point contact between the rollers 40 and the tows 34 is maintained as the compaction device 20 moves over and around the radius edge 32, and may also function to accommodate surface unevenness due, for example, to ply drop offs.

Figure 11:
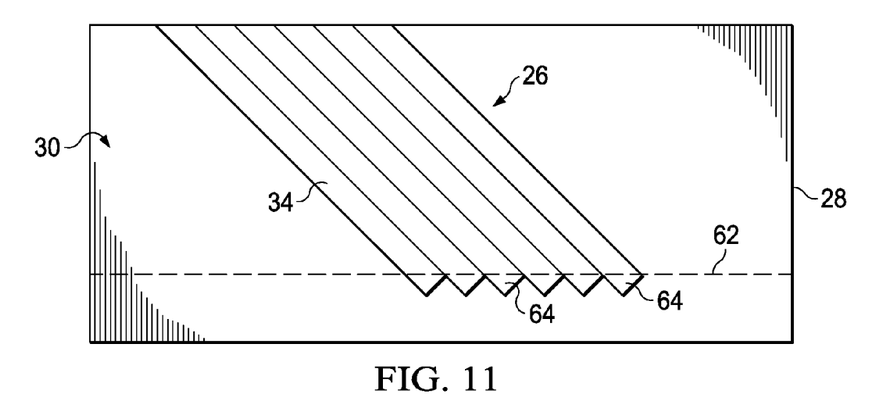
FIG. 11 is an illustration of a front elevational view of the tool, showing a crenulated edges of the end of a bandwidth course, and a trim line.

Referring to FIG. 11, due to the smaller diameter of the compaction rollers 40, compared to a single compaction roller of larger diameter, less material remains below a trim 62 at the end of each course 64. Consequently, less material is required to be trimmed away thus saving material costs.

Figure 12:
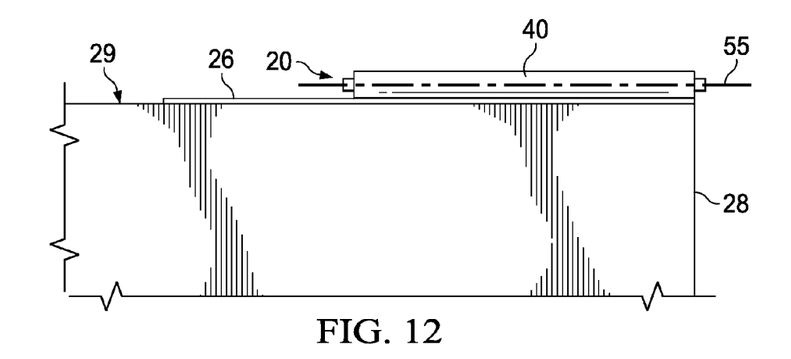
FIG. 12 is an illustration of a side view of a tool showing the position of the compaction rollers when laying down fiber tows having a 90° orientation.
Figure 13:
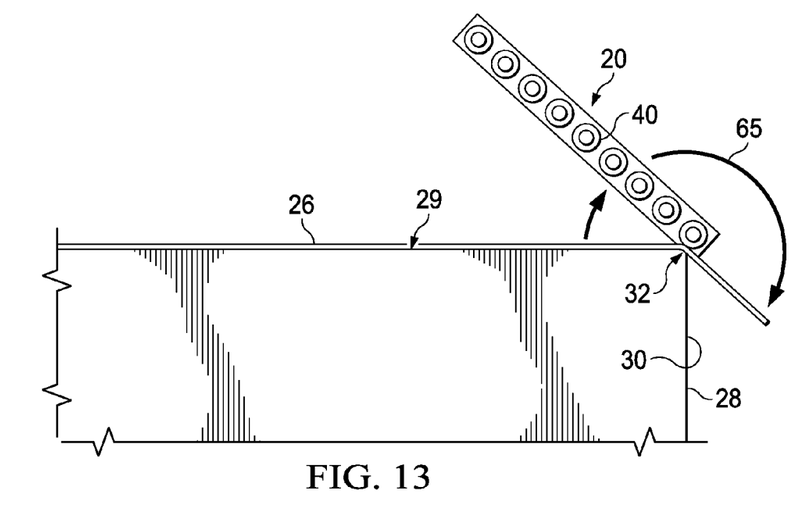
FIG. 13 is an illustration of a side view of a tool showing rotation of the compaction rollers traversing an edge on the tool when laying down fiber tows having a 0° orientation.

FIG. 12 shows the compaction device 20 compacting a bandwidth 26 of 0° fiber tows on the horizontal surface 29 of the tool 28. In this case, the compaction rollers 40 roll across and remain in contact the horizontal surface 29, with no adjustment of their respective attitudes, i.e., they remain in a common plane. FIG. 13 illustrates the compaction device 20 compacting a bandwidth 26 of 90° fiber tows 34 on the tool 28. When compacting 90° fiber tows 34, the entire AFP head 22, and thus the compaction device 20 rotates around the radius edge 32, onto the vertical surface 30. As the AFP head 22 rotates, the compaction rollers 40 also remain in a common plane, each successively rolling over the radius edge 32.

Figure 14:
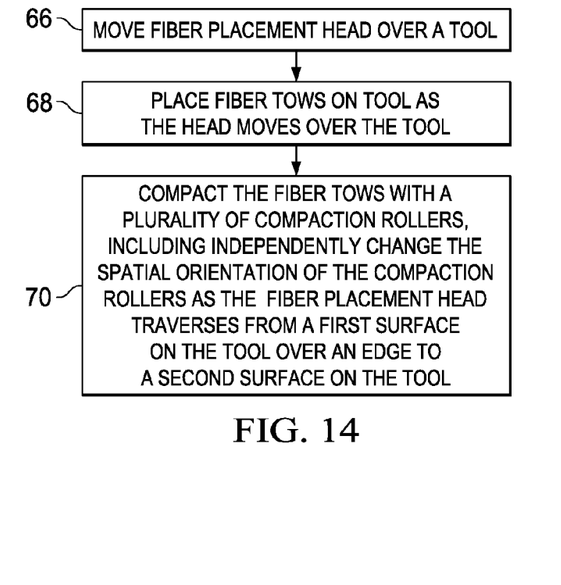
FIG. 14 is an illustration of a flow diagram of a method of compacting fiber tows on a tool having first and second surfaces lying in different planes joined along an edge.

FIG. 14 broadly illustrates the steps of a method of compacting fiber tows 34 onto a tool such as a tool 28 using the compaction device 20 described above. At 66, an AFP head 22 is moved over the tool 28. At 68 the AFP head 22 places the fiber tows 34 on the tool 28 as the head 22 moves over the tool 28. At 70, a plurality of compaction rollers 40 are used to compact the fiber tows 34 on the tool 28. The spatial orientation of the compaction rollers 40 is independently changed or adjusted as the AFP head 22 traverses from a first surface 29 on the tool 28 over an edge 32 onto a second surface 30 on the tool 28.

Figure 15:
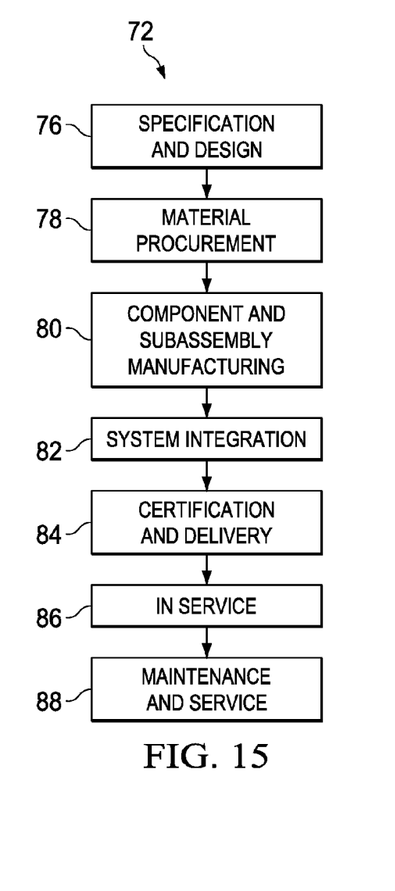
FIG. 15 is an illustration of a flow diagram of aircraft production and service methodology.
Figure 16:
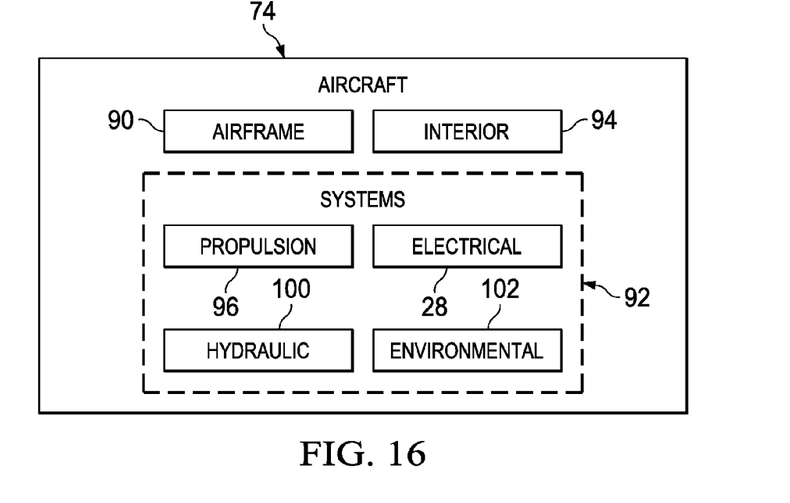
FIG. 16 is an illustration of a block diagram of an aircraft.

Embodiments of the disclosure may find use in a variety of potential applications, particularly in the transportation industry, including for example, aerospace, marine, automotive applications and other application where composite members such as spars and stringers are used. Thus, referring now to FIGS. 15 and 16, embodiments of the disclosure may be used in the context of an aircraft manufacturing and service method 72 as shown in FIG. 15 and an aircraft 74 as shown in FIG. 16. Aircraft applications of the disclosed embodiments may include, for example, without limitation, spars, stringers and other structures having undulations or angled corners. During pre-production, exemplary method 72 may include specification and design 76 of the aircraft 74 and material procurement 78. During production, component and subassembly manufacturing 80 and system integration 82 of the aircraft 74 takes place. Thereafter, the aircraft 74 may go through certification and delivery 84 in order to be placed in service 86. While in service by a customer, the aircraft 74 is scheduled for routine maintenance and service 88, which may also include modification, reconfiguration, refurbishment, and so on.

Each of the processes of method 72 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 74 produced by exemplary method 72 may include an airframe 90 with a plurality of systems 92 and an interior 94. Examples of high-level systems 92 include one or more of a propulsion system 96, an electrical system 98, a hydraulic system 100 and an environmental system 102. Any number of other systems may be included. Although an aerospace example is shown, the principles of the disclosure may be applied to other industries, such as the marine and automotive industries.

Systems and methods embodied herein may be employed during any one or more of the stages of the production and service method 72. For example, components or subassemblies corresponding to production process 80 may be fabricated or manufactured in a manner similar to components or subassemblies produced while the aircraft is in service. Also, one or more apparatus embodiments, method embodiments, or a combination thereof may be utilized during the production stages 80 and 82, for example, by substantially expediting assembly of or reducing the cost of an aircraft 74. Similarly, one or more of apparatus embodiments, method embodiments, or a combination thereof may be utilized while the aircraft 74 is in service, for example and without limitation, to maintenance and service 88.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device for compacting only a bandwidth of fiber tows on a tool, comprising:
a frame adapted to be moved over surfaces of the tool; and
a plurality of compaction rollers mounted on the frame for independent relative displacement, each of the compaction rollers adapted to compact the fiber tows onto the surfaces of the tool, wherein each of the compaction rollers has first and second opposite ends, and the device further comprises:
pins fixed to each of the first and second ends of the compaction rollers and slidably mounting the compaction roller on the frame.

2. The device of claim 1, wherein:
the frame includes a pair of spaced apart arms, and
the compaction rollers extend between and have opposite ends thereof respectively rotatably mounted on the pair of arms.

3. The device of claim 1, further comprising:
a spring on each of the first and second opposite ends of the compaction rollers for biasing the compaction rollers toward the surfaces of the tool.

4. The device of claim 1, wherein the compaction rollers extend substantially parallel to each other.

5. The device of claim 4, wherein:
the tows each have a width,
there is a pitch between centers of the compaction rollers, and
the pitch is substantially equal to the width of the tows.

6. The device of claim 1, wherein:
the compaction rollers normally lie in a single plane, and
at least certain of the compaction rollers are adapted to move out of the single plane when the compaction rollers traverse over an edge of the surfaces of the tool.

7. The device of claim 1, further comprising:
a bearing block at each end of each of the compaction rollers, wherein each end of the compaction rollers is journaled for rotation in one of the bearing blocks; and
springs respectively sleeved over the pins for biasing the bearing blocks toward the surfaces of the tool.

8. The device of claim 1, wherein the compaction rollers are equal in number to the fiber tows.

9. A device for compacting only a bandwidth of fiber tows on a tool having tool surfaces intersecting at an angle forming an edge on the tool, comprising:
a pair of arms spaced apart from each other; and
a plurality of displaceable compaction rollers extending between the arms and mounted on the arms for independent displacement relative to each other as the compaction rollers traverse over the edge of the tool, wherein each of the plurality of displaceable compaction rollers is spring biased toward the tool surfaces.

10. The device of claim 9, wherein the plurality of displaceable compaction rollers extend substantially parallel to each other and normally lie in a single plane but are individually displaceable out of the single plane when traversing the edge on the tool.

11. The device of claim 9, wherein compaction rollers are substantially equal in number to the fiber tows in the bandwidth.

12. The device of claim 9, wherein a distance between centers of adjacent ones of the compaction rollers is substantially equal to a width of each of the tows.

13. The device of claim 9, further comprising:
a supporting frame; and
suspension mechanisms mounting the compaction rollers on the frame for individual displacement relative to the frame.

14. The device of claim 9, wherein the compaction rollers extend substantially parallel to each other.

15. A device for compacting only a bandwidth of fiber tows on a tool, comprising:
a frame adapted to be moved over surfaces of the tool;
a plurality of compaction rollers mounted on the frame for independent relative displacement, each of the compaction rollers adapted to compact the fiber tows onto the surfaces of the tool, and wherein:
the compaction rollers extend substantially parallel to each other;
the tows each have a width;

there is a pitch between centers of the compaction rollers; and the pitch is substantially equal to the width of the tows.

16. The device of claim 15, wherein:

the frame includes a pair of spaced apart arms, and the compaction rollers extend between and have opposite ends thereof respectively rotatably mounted on the pair of arms.

17. The device of claim 15, wherein each of the compaction rollers has first and second opposite ends, and the device further comprises:

pins fixed to each of the first and second ends of the compaction rollers and slidably mounting the compaction roller on the frame.

18. The device of claim 17, further comprising:

a spring on each of the first and second opposite ends of the compaction rollers for biasing the compaction rollers toward the surfaces of the tool.

19. The device of claim 15, wherein:

the compaction rollers normally lie in a single plane; and at least certain of the compaction rollers are adapted to move out of the single plane when the compaction rollers traverse over an edge of the surfaces of the tool.

20. The device of claim 15, wherein the compaction rollers are equal in number to the fiber tows.

* * * * *